Jan. 8, 1957 J. P. OLIVER 2,776,940
MOUNTING FOR UNDERWATER ANODE FOR SHIP'S HULL
Filed Dec. 24, 1953
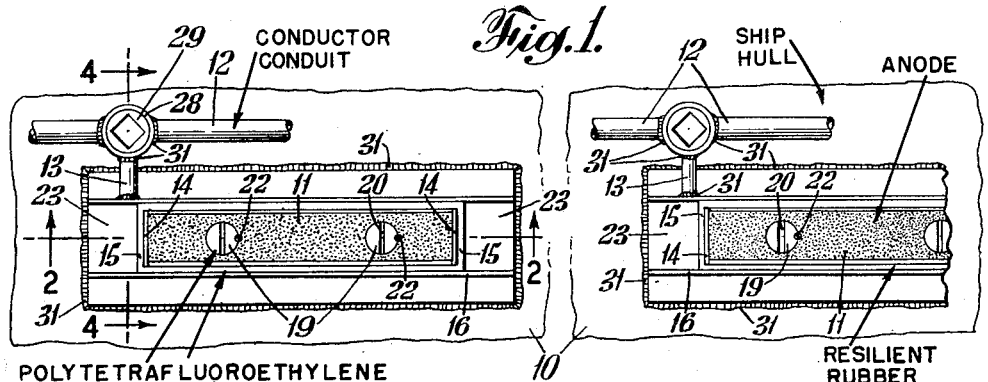
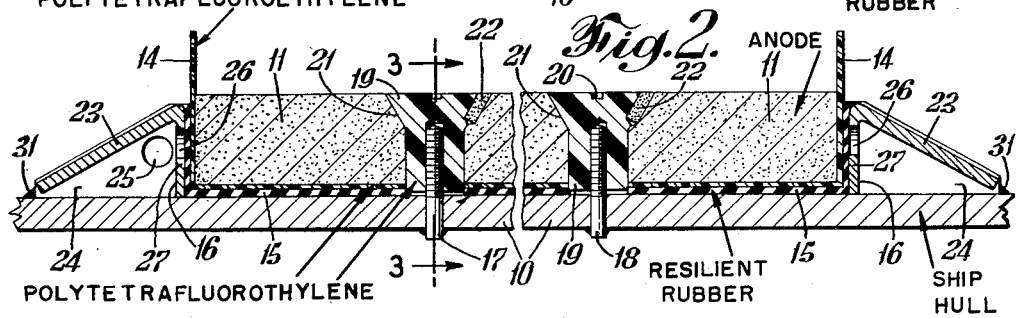
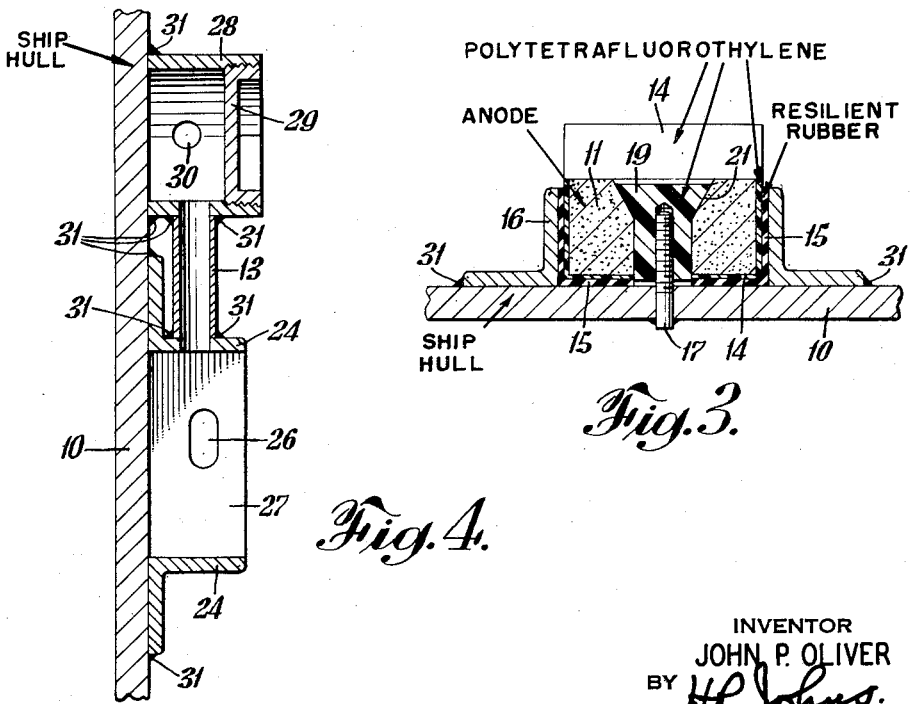
INVENTOR
JOHN P. OLIVER
BY
ATTORNEY

United States Patent Office 2,776,940
Patented Jan. 8, 1957

2,776,940

MOUNTING FOR UNDERWATER ANODE FOR SHIP'S HULL

John P. Oliver, Berea, Ohio, assignor to Union Carbide and Carbon Corporation, a corporation of New York Application December 24, 1953, Serial No. 400,243

1 Claim. (Cl. 204—196)

This invention relates to the mounting of an underwater anode such as is used in the so-called cathodic protection of a ship's hull against corrosion by sea water. An object of this invention is to prolong the life of a graphite anode used for this purpose. Another object is to simplify the construction and mounting of such an anode while prolonging its life, making a rugged unitary standard size receptacle capable of protecting the anode against mechanical injury from floating objects. A further object is to reduce the resistance offered by the anodes to a ship's movement through the water. Still another object is to safeguard the conductor carrying current to the under-water anodes.

The protection of the hull of a metal ship against corrosion is reputed to be well over a century old. Despite that fact such protection has not been widespread due to a variety of causes. The present invention has been developed in an effort to make the mounting of underwater anodes on a ship's hull more practical, longer lived, and therefore more useful. One objection in prior proposals has ben the effect of chlorine formed on the anode upon rubber insulation that has been used around such an anode to yieldably support the anode within the metal box. It has been discovered that such chlorine hardens the rubber layer by an oxidation type reaction causing it to lose its resiliency and eventually its electrical insulating character as well as aggravating deterioration of the anode. It has been found that a synthetic plastic such as polytetrafluoroethylene, known as "Teflon," is not attacked by chlorine as is rubber and a number of other insulating materials, but may be used contiguous the anode while retaining the rubber life for resiliency and insulation between the Teflon and the receptacle for longer than the time between dry-dockings.

Referring to the drawing, Fig. 1 shows a side elevation of two anodes in widely spaced relation on a ship's hull. Fig. 2 is a section on the line 2—2 of Fig. 1. Fig. 3 is a section on the line 3—3 of Fig. 2. Fig. 4 is a section on the line 4—4 of Fig. 1 on an enlarged scale.

A ship's metal hull 10 has mounted on it an underwater anode of graphite for protection of the hull against corrosion by sea water. A conductor for supplying current to the anode passes through the conduit 12 and its branch 13 to the anode 11. The flexible insulated conductor is attached to the anode by first sweating an externally splined sheath around a bared end of the conductor and then driving said sheathed end into a slightly undersize hole in the anode. Insulating material is then poured over the top of the splined sheath to form a seal between the bare metal of the sheath and the conductor insulation. Next to the anode 11 is a sheet 14 of polytetrafluoroethylene known commercially as "Teflon" for the purpose of insulating the anode 11 from a metal box in which the same is secured, as shown in the drawings. Between the insulation 14 and the walls of this box 16 is a layer of resilient rubber 15. The Teflon 14 need extend no more than to the outer surface of the anode 11 or the sides of the metal receptacle 16. The Teflon at the ends of the anode may extend 3 to 6 inches above the anode surface to lengthen a current path to the hull. This projection of Teflon is able to flex with motion of the ship. The longitudinal sides of the anode may also have the Teflon extend outward beyond the anode surface a similar amount. It is not necessary that the Teflon extend beyond the anode outer surface on either the ends or its longitudinal sides but is of advantage in lengthening the current path from the anode and tending to more uniform current distribution to the hull.

Welded or otherwise secured to the hull 10 are studs 17 and 18 projecting outward from the hull and having their projecting end portions threaded as illustrated for reception of insulating plugs 19, also preferably of Teflon, for holding the anode 11 secured to the hull and within the receptacle 16. On the outer surface of the plugs 19 is a slot 20 for reception of a screwdriver or recess for a spanner wrench. The head of each plug 19 is tapered outwardly at 21 as illustrated so that when the studs are tightly screwed in place the clamping of the bevelled heads against complementary bevelled recess walls is tight enough to minimize sea water entering between the anode and the plug. Prior art plugs have been of insulating material that is attacked by sea water or have been of a shape to provide rectangular enlarged heads which could not be given a tight fit on both the sides and the bottom of the enlarged head as can the present shape for the heads of plugs 19. After these plugs 19 have been screwed into their final position, then to hold them against becoming loose, a key 22 of cement or a Teflon pin has been found desirable.

The unitary container 16 is preferably welded on all sides to the ship's hull and is provided at its longitudinal ends with inclined guides 23 forming an angle of approximately between 20° and 40° with the adjacent hull surface. The space beneath these guides 23 is closed at the top and bottom by integral walls 24 also welded to the hull surface. The space between the walls and the guides 23 and the hull is not necessarily watertight, but is preferably so, to give maximum strength. The inclination of the guides 23 reduces water resistance of the receptacle 16 to movement of the ship and also is of rigid enough construction to deflect any floating or submerged objects from the end walls of the receptacle 16. A perforation 25 in the wall 24 is made at one end of the receptacle 16 around which is welded the branch conduit 13 in order that a supply conductor may be brought into the space beneath the guide 23 at one end of the anode and connected to the anode itself through a second perforation 26 in the under wall 27 of the integral receptacle 16. The junction box 28 may be of a construction provided with a screw threaded cover 29 as shown in Fig. 4. The inside of the junction box 28 and conduits 12 and 13 are preferably kept dry and watertight. This is accomplished after the supply conductor is installed by filling-in around it in conduit 13 with a sealing compound. The current carrying conductor within the conduit 12 enters the junction box through a hole 30 shown in Fig. 4. The welds on all sides of the junction box are shown by the numeral 31 in the drawings to keep out sea water.

Among the advantages of this invention may be mentioned the selection of an appropriate insulating material contiguous the anode 11 which is inert to attack by sea water and by chlorine formed on the anode. The rubber layer 15 on the sides and bottom of the anode holder provides a resilient mounting for it thereby reducing the hazard of anode breakage. The tapered plugs 19 are of a material that is also inert to sea water and to chlorine gas formed on the anode. The tapered surfaces 21 of these plugs 19 enable a relatively tight fit to be made between the plug head and the anode. The unitary rugged construction for the receptacle 16 enables these receptacles to be of standard form for the reception of a standard size anode. The receptacle 16 is also of such rugged construction as to safeguard the anode from being injured by floating objects. Two or more anodes appropriately spaced are mounted on each side of the hull.

To more nearly approach uniformity in current distribution over the hull surface, either the rubber insulation 15 or Teflon 14 may be extended above the outer edge of the receptacle 16 and above the edge of the outer surface of the anode 11 if desired, to lengthen the current path.

While prior art constructions have had a short life due to the embrittlement of the rubber in as short a time as 18 months, the improved mounting of the anodes in this invention has a much longer life, and a life at least long enough to permit operation of the anodes for their intended purpose during the complete period of time between dry dockings. In operation it has been found that a calcareous deposit forms on the ship's hull near the place of attachment of these anodes, and such deposit further aids toward more uniform current density throughout the hull surface. A ship 400 feet long should require four anodes on each side with about a hundred feet between them and fifty feet beyond the foremost and rearmost anodes. Other insulating materials capable of being used in place of the Teflon for the sheets 14 and plugs 19 are polyethylene, and a natural resin made from cashew nut shell oil and known as cardolite. Glass is also suitable for the plugs. The latter two are less strong mechanically than the Teflon and the glass not machinable. The layers of Teflon need not be held against the anode so tightly that a perfect seal is formed but only tight enough to prevent organic deposits such as would take place if unlimited access to sea water were allowed. If the Teflon extends beyond the outer surface of the anode on all sides, it is not necessary that the Teflon sheets be connected at the projecting corners. The anode holder, the junction box, and the metal conduits through which a supply conductor extends are each of cast or rolled steel to be of inexpensive construction and adapted to introduce no electrolytic complication when welded to the hull. In the presence of the potentialized anode all the metal parts are cathodic and any inherent difference in potential between dissimilar metals due to their position in the electromotive series is eliminated.

I claim:

An anode mounting on a metallic ship's hull comprising a metal holder secured to said hull and forming therewith an anode receptacle, a friable carbon anode disposed in said receptacle, an impact cushioning and insulating rubber lining between the walls of said receptacle and said anode, a polytetrafluoroethylene lining disposed between said anode and said rubber lining, and polytetrafluoroethylene securing means for retaining said anode in operative assembly with said hull, whereby said carbon anode tending to release effective amounts of chlorine to deleteriously alter the cushioning and insulating characteristics of said rubber lining, said polytetrafluoroethylene lining shielding said rubber lining from the deleterious effects of said chlorine, thereby substantially extending the operable life of said anode, and said polytetrafluoroethylene lining extending beyond said receptacle lip, thereby affording a lengthened path between said anode and said rubber lining.

References Cited in the file of this patent

UNITED STATES PATENTS 2,025,243　　Jackson et al. ＿＿＿＿＿＿＿＿＿＿ Dec. 24, 1935

FOREIGN PATENTS 749,636　　France ＿＿＿＿＿＿＿＿＿＿＿＿＿＿＿＿ May 8, 1933

OTHER REFERENCES

"Transactions of The Electrochemical Society," vol. 90 (1946), pp. 331–340, paper by Yelton.